(12) United States Patent
Bellanger

(10) Patent No.: US 6,455,773 B2
(45) Date of Patent: Sep. 24, 2002

(54) BRANCH CONNECTION BOX FOR TRUNKING, IN PARTICULAR FOR TRUNKING THAT PASSES THROUGH A FLOOR

(75) Inventor: Jérôme Bellanger, Le Mans (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 09/864,238

(22) Filed: May 25, 2001

(30) Foreign Application Priority Data

May 29, 2000 (FR) .............................................. 00 06839

(51) Int. Cl.7 ................................................. H02G 3/08
(52) U.S. Cl. ............................. 174/50; 174/58; 220/3.2
(58) Field of Search .............................. 174/48, 49, 50, 174/53, 54, 57, 58, 17 R, 68.3; 220/3.2, 3.3, 3.8, 4.02, 4.01, 241; 52/220.1, 220.3, 220.5, 220.7

(56) References Cited

U.S. PATENT DOCUMENTS

| | | | | |
|---|---|---|---|---|
| 2,930,504 A | * | 3/1960 | Hudson | 174/48 |
| 4,295,575 A | * | 10/1981 | Flachbarth | 220/3.8 |
| 5,270,490 A | * | 12/1993 | Yang | 174/48 |
| 5,362,922 A | | 11/1994 | Whitehead | |
| 5,486,650 A | * | 1/1996 | Yetter | 174/53 |
| 5,682,017 A | * | 10/1997 | Marrotte | 174/53 |
| 5,770,817 A | * | 6/1998 | Lo | 174/53 |
| 5,796,037 A | | 8/1998 | Young et al. | |
| 5,944,210 A | * | 8/1999 | Yetter | 220/3.8 |
| 6,072,121 A | * | 6/2000 | Penczak et al. | 174/48 |
| 6,274,809 B1 | * | 8/2001 | Pudims et al. | 174/48 |

FOREIGN PATENT DOCUMENTS

| | | | | |
|---|---|---|---|---|
| FR | 2 709 614 | | 3/1995 | |
| GB | 2307115 | * | 11/1995 | 174/48 |

* cited by examiner

Primary Examiner—Dean A. Reichard
Assistant Examiner—Angel R. Estrada
(74) Attorney, Agent, or Firm—Young & Thompson

(57) ABSTRACT

A branch connection box for trunking includes a base and a cover. The base includes a central housing delimited by partitions that can be cut and form an electrical connection box and, around the central housing, an open path for routing electrical conductors or cables.

16 Claims, 4 Drawing Sheets

BRANCH CONNECTION BOX FOR TRUNKING, IN PARTICULAR FOR TRUNKING THAT PASSES THROUGH A FLOOR

BACKGROUND OF THE INVENTION

1. Field of the Invention

The present invention relates to a branch connection box for trunking, in particular for trunking that passes through a floor, including a base and a cover.

2. Description of the Prior Art

One prior art branch connection box includes a separator which can be positioned above the base to create two mutually-isolated levels within the box.

The base and the separator of the prior art branch connection box include vertical partitions in a quincunx arrangement which can be cut to create paths for routing electrical conductors or cables.

The main drawback of the above kind of branch connection box is that it is relatively complicated to use because the installer must cut the partitions of the base and the separator as required in order to pass the electrical conductors or cables from one run of trunking to the other.

Also, the above kind of branch connection box does not include any housing constituting a connection box within the branch connection box.

SUMMARY OF THE INVENTION

To remedy the above drawbacks, the present invention proposes a branch connection box for trunking, the box including a base and a cover, wherein the base includes a central housing delimited by partitions that can be cut and forming an electrical connection box and, around the central housing, an open path for routing electrical conductors or cables.

Thus in the branch connection box according to the invention, and in conformance with the applicable standards, the connections between the electrical cables or conductors from the runs of trunking can be made inside the central housing forming an electrical connection box, the electrical cables or conductors to be connected in the central housing arriving via an opening formed by cutting one of the partitions delimiting the central housing on the base.

One preferred embodiment of the branch connection box according to the invention includes a separator adapted to be positioned above the base to create in the box two levels isolated from each other, namely a level for high-current conductors or cables and a level for low-current conductors or cables, wherein the separator has a central opening through it flanked by partitions which can be cut and, on each face of the separator, around the central opening, an open path for routing electrical conductors or cables, the central opening forming an extension of the central housing of the base.

Advantageously, in this preferred embodiment of the branch connection box according to the invention the partitions flanking the central opening of the separator and on the side facing toward the base form guide surfaces which slide on the partitions delimiting the central housing of the base during mounting of the separator on the base.

The above kind of branch connection box is easy to use because the open paths for routing electrical conductors or cables on the base and on the separator enable the installer to route electrical conductors or cables quickly from one run of trunking to another.

Also, the separator is easy to position on the base because its guide surfaces slide on the partitions delimiting the central housing of the base.

According to another particularly advantageous feature of the branch connection box according to the invention the separator can be placed at different positions in the height-wise direction relative to the base between top and bottom limiting positions to adapt the wiring volume of the two levels as required.

To this end the separator is slidably mounted on the base section and in particular the separator includes elastic tongues whose ends are adapted to slide in grooves on the outside face of upstanding chimneys on the base.

According to another feature of the branch connection box according to the invention the cover is in two parts, namely a first part forming a belt adapted to cover the base and including a peripheral side wall provided with openings communicating with the interior of the trunking and a front wall provided with a central opening providing access to the interior of the branch connection box and in particular to the central housing and to at least part of the path for routing electrical conductors or cables, and a closure plate for closing the front wall of the belt part.

When it is partly closed by the belt part positioned on the base, the cover of the branch connection box provides access to the interior of the branch connection box via the central opening in the front wall of the belt part.

In one embodiment of the branch connection box according to the invention the belt part is fixed to the base by screws screwed into chimneys on the base.

In one embodiment the belt part is fixed to the plate, which it covers, by screws that are screwed into chimneys on the plate.

To this end the front wall of the part belt advantageously carries guide studs for the fixing screws adapted to bear on ends of the chimneys.

Further, in accordance with other advantageous and non-limiting features of the branch connection box according to the invention:

the branch connection box includes covers attached to unused openings in the belt part to close them off, the central housing of the base is circular and in conjunction with the open path forms a roundabout for routing electrical conductors or cables, the open paths for routing electrical conductors or cables of the base and the separator are identical in shape and the central opening in the separator is identical in shape to the central housing of the base, the base has, on its edges adapted to be placed adjacent cut ends of base sections of runs of trunking, partitions defining, in conjunction with partitions at the edges of the separator, parallelepiped-shaped housings isolated from each other and open toward the outside of the box, the partitions of the base and the separator being adapted to be cut to form ducts for inserting electrical conductors or cables at one of the levels of the box, isolated from the other level thereof, and the branch connection box includes a plate in the form of a frame clipped around the base and adapted to be covered by the belt part of the cover, the plate in the form of a frame having, on its edges adapted to be placed adjacent cut ends of base sections of runs of trunking, partitions defining, in conjunction with partitions on the edges of the separator, parallelepiped-shaped housings isolated from each other and open toward the outside of the box, the partitions of the plate and of the separator being adapted to be cut to form ducts for inserting electrical conductors or cables at one of the levels of the box, isolated from its other level.

The following description with reference to the accompanying drawings, which are provided by way of non-limiting example, explains in what the invention consists and how it can be put into effect.

DETAILED DESCRIPTION OF THE PREFERRED EMBODIMENTS

Figure 1:
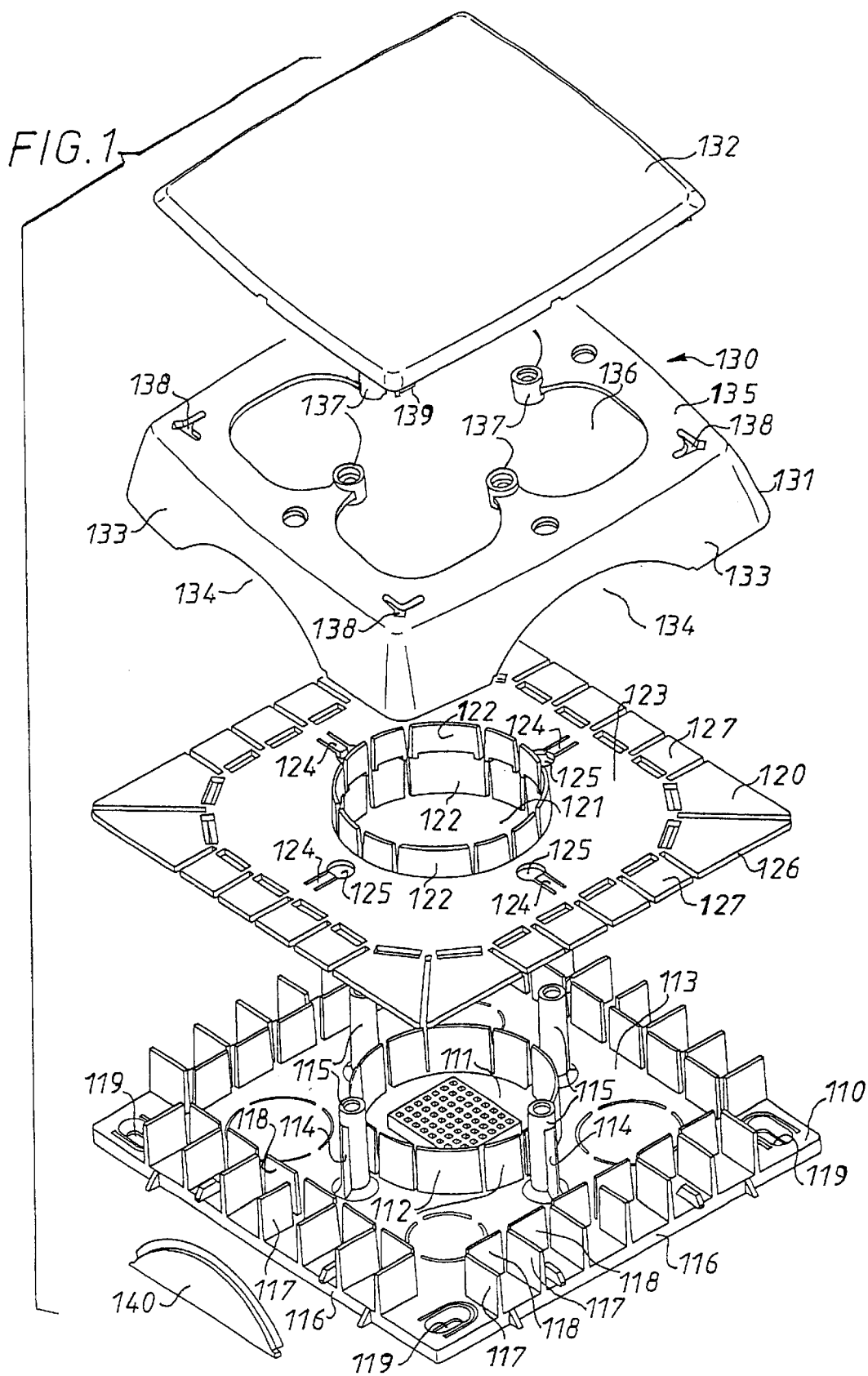
FIG. 1 is an exploded perspective view of a preferred embodiment of a branch connection box according to the invention.
Figure 2:
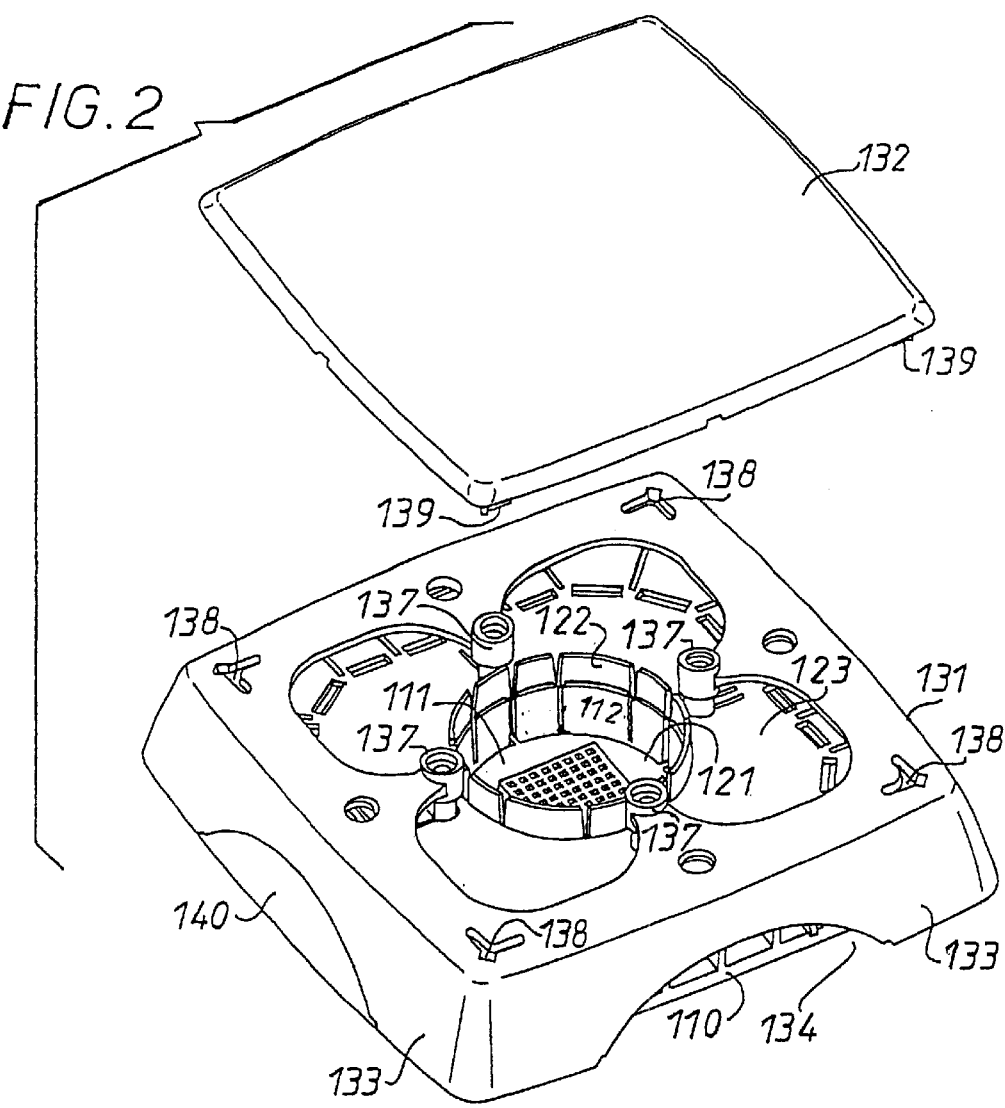
FIG. 2 is a perspective view of the branch connection box shown in FIG. 1 when assembled and partly opened.
Figure 5:
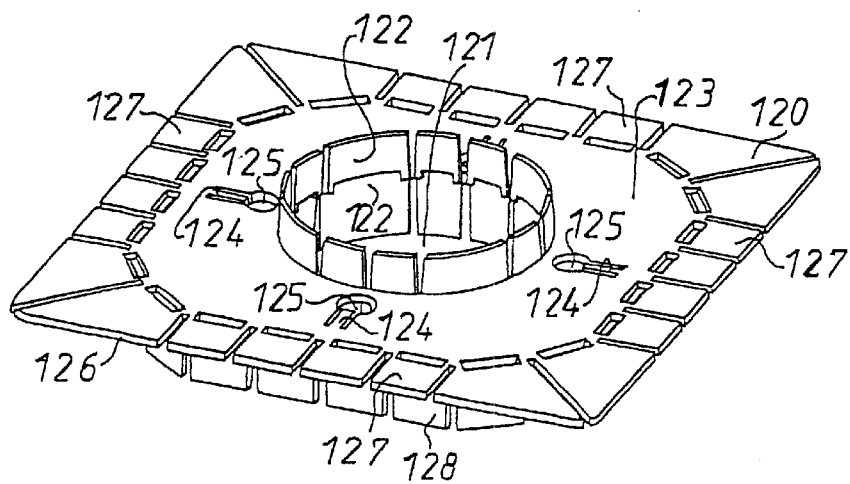
FIG. 5 is a three-quarter perspective view of the separator of the branch connection box shown in FIG. 1.

FIGS. 1 and 2 show a branch connection box 100 for trunking and in particular for trunking that passes through a floor.

The branch connection box 100 has a base 110 in the form of a square plate adapted to be fixed to a support, which support is the floor in the case of trunking that passes through a floor or a vertical support in the case of wall-mounted trunking, by means of screws engaged in openings 119 provided for this purpose at the four corners of the base.

Each edge 116 of the base 110 is adapted to be positioned adjacent a cut edge of a base section of a run of trunking.

The base 110 includes a central housing 111 delimited by partitions 112 carried by the base 110 and which can be cut.

The central housing 111 forms an electrical connection box inside the branch connection box in which electrical connections can be made between electrical conductors or cables from different runs of trunking opening into the branch connection box 100.

An open path 113 for routing electrical conductors or cables is defined around the central housing 111.

As shown here, the central housing 111 in the base 110 is preferably circular and forms with the open path 113 a roundabout for routing electrical cables or conductors.

The branch connection box 100 further includes a separator 120 adapted to be positioned on top of the base 110 to define in the box two levels isolated from each other, one level for high-current conductors or cables and one level for low-current conductors or cables.

The separator 120 takes the form of a square plate identical to that of the base and advantageously includes a central opening 121 through it and flanked by partitions 122 which project from each face of the separator, together with an open path 123 for routing electrical conductors or cables on each face of the separator, around the central opening 121.

The central opening 121 through the separator forms an extension of the central housing 111 of the base 110 (see FIG. 2).

The partitions 122 around the central opening 121 in the separator 120 can also be cut to form electrical conductor or cable entries into the connection box formed by the stacked central openings of the base and the separator.

The central opening 121 through the separator 120 is advantageously exactly the same shape as the central housing of the base 110, of course, the shapes of the open paths 113, 123 for routing electrical conductors or cables of the base and the separator also being identical.

The partitions 122 around the central opening 121 in the separator 120 and on the side facing toward the base 110 advantageously also form guide surfaces which slide on the partitions 112 delimiting the central housing 111 of the base 110 when the separator 120 is fitted to the base 110.

It is therefore particularly easy to mount the separator 120 on the base 110, and when the separator 120 is mounted on the base 110 the connection box of the branch connection box is locally isolated from the cable routing path by a double partition consisting of the stacked partitions 112, 122 on the base and the separator.

Figure 3:
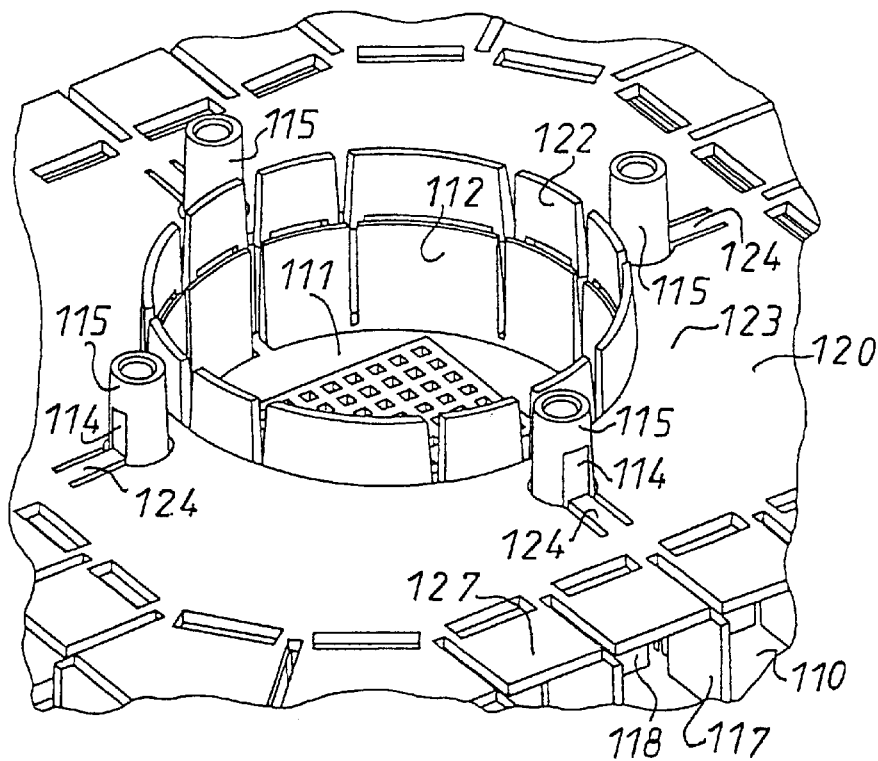
FIG. 3 is a detail viewing showing the mounting of a separator on a base of the branch connection box shown in FIG. 1 in a bottom limiting position.
Figure 4:
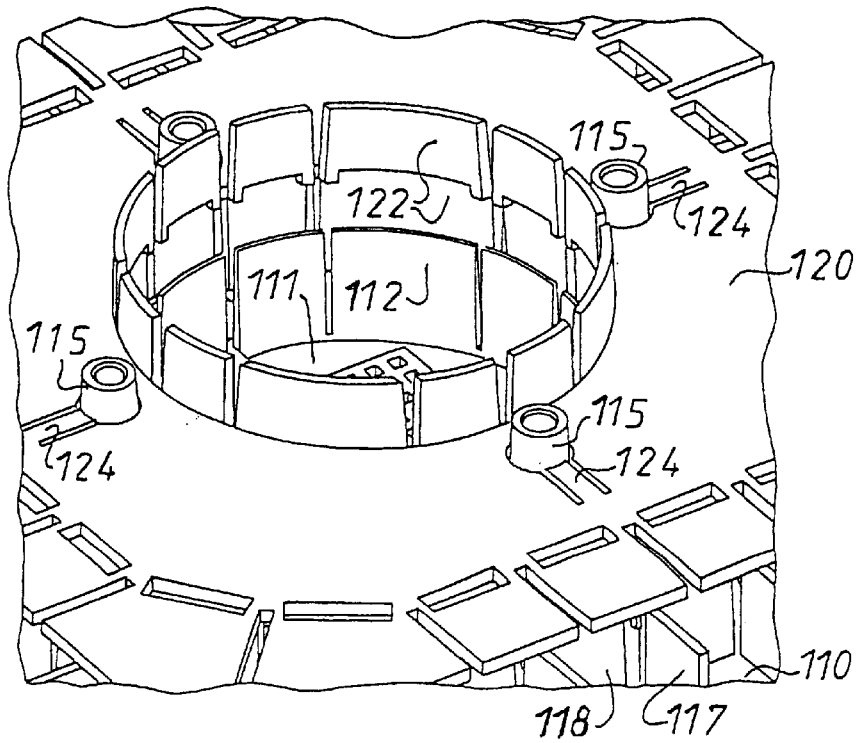
FIG. 4 is a detail viewing showing the mounting of the separator on the base of the branch connection box shown in FIG. 1 in a top limiting position.

As shown in FIGS. 3 and 4 in particular, the separator 120 is adapted to be placed at different positions in the heightwise direction relative to the base 110 between a top limiting position (see FIG. 4) and a bottom limiting position (see FIG. 3), to adapt the wiring volume of the two levels of the branch connection box as required.

To this end, the separator 120 is slidably mounted on the base 110.

In the embodiment shown in the figures the separator 120 incorporates integral elastic tongues 124 cut into the plate forming the separator, whose ends open into circular housings 125 which can be threaded over chimneys 115 on the base section, the ends of the elastic tongues 124 being able to slide in grooves 114 on the outside face of the chimneys 115.

Of course, the ends of the elastic tongues 124 hold the separator 120 in position on the chimneys 115 by friction and the position of the separator 120 relative to the base 110 is adjusted by pushing the separator 120 down or pulling it up so that the elastic tongues 124 slide in the grooves 114 in the chimneys 115.

The branch connection box 100 further includes a cover 130 which, as shown here, is advantageously in two parts, namely a belt part 131 adapted to cover the base 110, the belt part 131 having a peripheral side wall 133 with arch-shaped openings 134 communicating with the interior of a run of trunking positioned adjacent the branch connection box, and a front wall 135 in which there is a central opening 136 providing access to the interior of the branch connection box, and in particular to the central housing 111, and to at least part of the path 123 for routing electrical conductors or cables, and a closure plate 132 for the front wall 135 of the belt part 131.

The central opening 136 in the belt part 131 of the cover 130 is preferably in the shape of a four-leaf clover, as shown here, the leaves of which extend from a central area that is centered on the central housing 111, 121 forming the connection box of the branch connection box 100.

The openings defined by the leaves of the central opening 136 in the belt part 131 provide access to the open path 123 for routing cables provided in the branch connection box 100.

In the embodiment shown in FIGS. 1 and 2 the belt part 131 of the cover of the branch connection box 100 is fixed to the base 110 by screws that screw into chimneys 115 on the base section 110.

The chimneys 115 are those used for slidable mounting of the separator 120 on the base 110.

To this end, the front wall 135 of the belt part 131 carries guide studs 137 each of which is at the junction between two leaves of the central opening 136 in the shape of a four-leaf clover. The studs are designed to rest on the ends of the chimneys 115 on the base 110.

On the inside of the guide studs 137 is an annular rim supporting the head of each fixing screw.

The closure plate 132 clips onto the front wall 135 of the belt part 131.

To be more specific, the square closure plate 132 has at its four corners L-shaped clips 139 which clip into openings 138 of complementary shape in the four corners of the front wall 135 of the belt part 131 of the cover 130.

Covers 140 whose shape is complementary to that of the arch-shape openings 134 in the peripheral side wall 133 of the belt part 131 can be attached to the unused arch-shaped openings 134 in the belt part 131 to block them off (see FIG. 2).

In the embodiment shown in FIGS. 1 to 5, the base 110 has, at its edges 116 that can be positioned adjacent the cut ends of the base sections of runs of trunking, partitions 117, 118 which can be cut and which, in conjunction with partitions 127, 128 on the edges 126 of the separator 120 (see FIG. 5), define parallelepiped-shaped housings isolated from each other and open toward the outside of the branch connection box.

The partitions 117, 118, 127, 128 of the base 110 and the separator 120 can be cut to form ducts for inserting electrical conductors or cables at one level of the box, isolated from its other level.

The partitions 117, 118, 127, 128 are cut as required by the installer, of course.

The various components of the branch connection box previously described are advantageously molded from plastics material.

The present invention is in no way limited to the embodiment described and shown and many variants thereof within the scope of the invention will suggest themselves to the skilled person.

Figure 6:
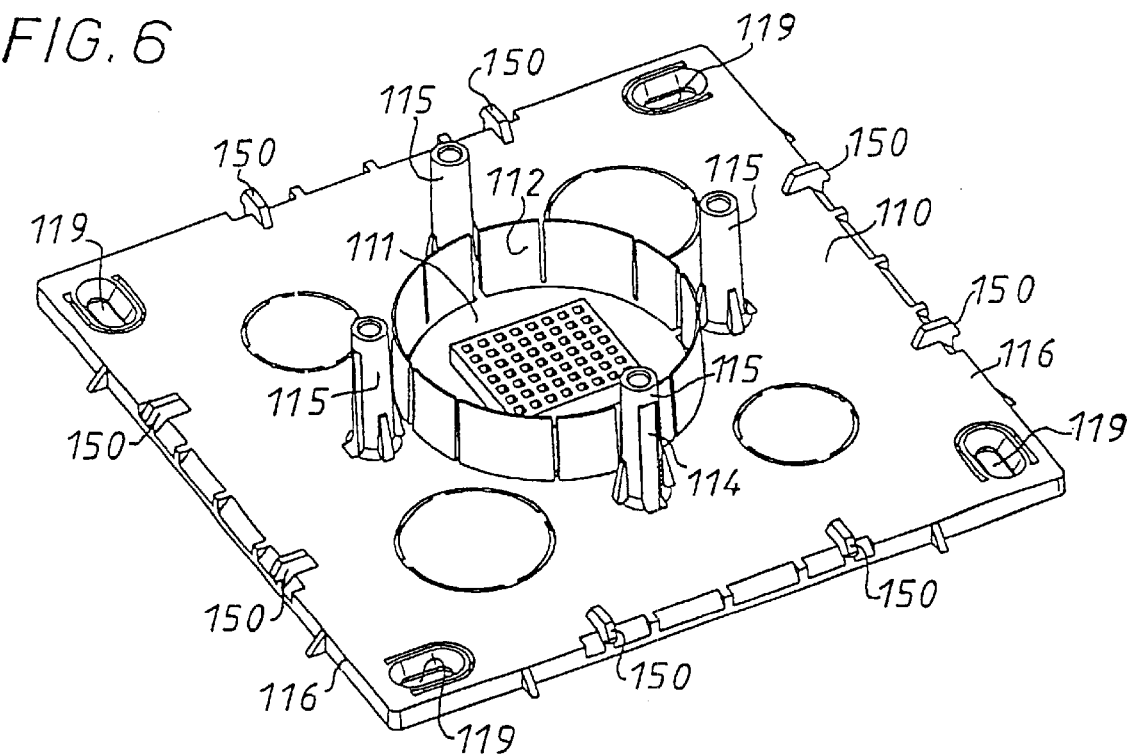
FIG. 6 is a top perspective view of a different embodiment of the base of the branch connection box according to the invention.
Figure 7:
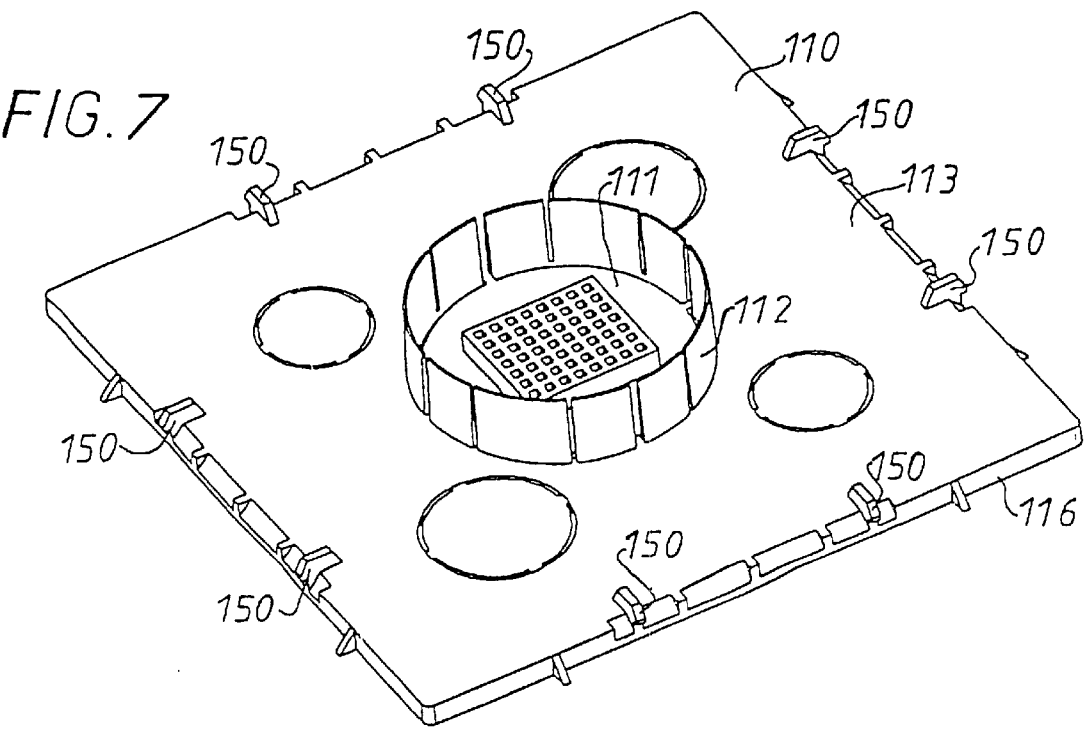
FIG. 7 is a top perspective view of a further embodiment of the base of the branch connection box according to the invention.

For example, as shown in FIGS. 6 and 7, the base section 110 could have at its edges 116 means 150 for clipping on a square plate (not shown) for mounting a belt part of a closure cover section having greater dimensions than those of the base section.

To this end, the square plate clipped around the base 110 would then have at its peripheral edges partitions for isolated entry of different electrical conductors into the branch connection box at different levels.

The plate in the form of a frame (not shown) around the base could include the chimneys that receive the separator and to which the belt part of the cover is screwed, in which case the base 110 of the branch connection box would be simplified (see FIG. 7 in particular) as it would no longer include the chimneys.

There is claimed:

1. A branch connection box for trunking, said box including a base and a cover, wherein said base includes a central housing delimited by partitions that can be cut and forming an electrical connection box and, around said central housing, an open path for routing electrical conductors or cables, said partitions delimiting said central housing are substantially perpendicular to said base and separate said central housing from said open path.

2. The branch connection box claimed in claim 1 including a separator adapted to be positioned above said base to create in said box a wiring volume of two levels isolated from each other, namely a level for high-current conductors or cables and a level for low-current conductors or cables, wherein said separator has a central opening through it flanked by partitions which can be cut and, on each face of said separator, around said central opening, an open path for routing electrical conductors or cables, said central opening forming an extension of said central housing of said base.

3. The branch connection box claimed in claim 2 wherein said partitions flanking said central opening of said separator and on the side facing toward said base form guide surfaces which slide on said partitions delimiting said central housing of said base during mounting of said separator on said base.

4. The branch connection box claimed in claim 2 wherein said separator can be placed at different positions in a heightwise direction relative to said base between top and bottom limiting positions to adapt the wiring volume of said two levels as required.

5. The branch connection box claimed in claim 4 wherein said separator is slidably mounted on said base section.

6. The branch connection box claimed in claim 5 wherein said separator includes elastic tongues whose ends are adapted to slide in grooves on an outside face of upstanding chimneys on said base.

7. The branch connection box claimed in claim 1 wherein said cover is in two parts, namely a first part forming a belt adapted to cover said base and including a peripheral side wall provided with openings communicating with an interior of said trunking and a front wall provided with a central opening providing access to an interior of said branch connection box and in particular to said central housing and to at least part of said path for routing electrical conductors or cables, and a closure plate for closing said front wall of said belt part.

8. The branch connection box claimed in claim 7 wherein said belt part is fixed to said base by screws screwed into chimneys on said base.

9. The branch connection box claimed in claim 7 including a mounting plate in the form of a frame clipped around said base and wherein said belt part of said cover is fixed to said mounting plate, which it covers, by screws that are screwed into chimneys on said mounting plate.

10. The branch connection box claimed in claim 8 wherein said front wall of said belt part carries guide studs for said fixing screws adapted to bear on ends of said chimneys.

11. The branch connection box claimed in claim 7 wherein said closure plate clips onto said front wall of said belt part.

12. The branch connection box claimed in claim 7 including covers attached to unused openings in said belt part to close them off.

13. The branch connection box claimed in claim 1 wherein said central housing of said base is circular and in conjunction with said open path forms a roundabout for routing electrical conductors or cables.

14. The branch connection box claimed in claim 2 wherein said open paths for routing electrical conductors or cables of said base and said separator are identical in shape and said central opening in said separator is identical in shape to said central housing of said base.

15. The branch connection box claimed in claim 2 wherein said base has, on its edges, partitions defining, in conjunction with partitions at the edges of said separator, parallelpiped-shaped housings isolated from each other and open toward an outside of said box, said partitions of said base and said separator being adapted to be cut to form ducts for inserting electrical conductors or cables at one of said levels of said box, isolated from the other level thereof.

16. The branch connection box claimed in claim 2, wherein said cover is in two parts, namely a first part forming a belt adapted to cover said base and including a peripheral side wall provided with openings communicating with an interior of said trunking and a front wall provided with a central opening providing access to an interior of said branch connection box and in particular to said central housing and to at least part of said path for routing electrical conductors or cables, and a closure plate for closing said front wall of said belt part, and including a mounting plate in the form of a frame clipped around said base and adapted to be covered by said belt part of said cover, said plate in the form of a frame having, on its edges, partitions defining, in conjunction with partitions on edges of said separator, parallelpiped-shaped housings isolated from each other and open toward an outside of said box, said partitions of said plate and of said separator being adapted to be cut to form ducts for inserting electrical conductors or cables at one of said levels of said box, isolated from its other level.

* * * * *